(12) United States Patent
Giraud et al.

(10) Patent No.: US 12,498,092 B2
(45) Date of Patent: Dec. 16, 2025

(54) LIGHT MODULE FOR LIGHTING AND SIGNALING

(71) Applicant: VALEO VISION, Bobigny (FR)

(72) Inventors: Sylvain Giraud, Bobigny (FR); Michel Hermitte, Bobigny (FR); Jerome Chiron, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/709,671

(22) PCT Filed: Nov. 14, 2022

(86) PCT No.: PCT/EP2022/081731
§ 371 (c)(1),
(2) Date: May 13, 2024

(87) PCT Pub. No.: WO2023/088826
PCT Pub. Date: May 25, 2023

(65) Prior Publication Data
US 2025/0003565 A1    Jan. 2, 2025

(30) Foreign Application Priority Data
Nov. 17, 2021    (FR) ...................................... 2112161

(51) Int. Cl.
*B60Q 1/00*    (2006.01)
*F21S 41/148*    (2018.01)
(Continued)

(52) U.S. Cl.
CPC .......... *F21S 41/148* (2018.01); *B60Q 1/0047* (2013.01); *F21S 41/255* (2018.01);
(Continued)

(58) Field of Classification Search
CPC ........ F21S 41/148; F21S 43/14; F21S 43/237; F21S 43/245; F21S 43/253; F21S 43/26; B60Q 1/0047
See application file for complete search history.

(56) References Cited

U.S. PATENT DOCUMENTS 7,437,050 B2    10/2008    Bourdin et al.
7,726,854 B2     6/2010    Bourdin et al.
(Continued)

FOREIGN PATENT DOCUMENTS

EP    1434000 A2    6/2004
EP    1605201 A1    12/2005
(Continued)

OTHER PUBLICATIONS

Search English translation of JP 2012190762 A (Year: 2012).*
(Continued)

*Primary Examiner* — Omar Rojas Cadima
(74) *Attorney, Agent, or Firm* — Valeo Vision

(57) ABSTRACT

The invention relates to a luminous module of a motor vehicle, including a first assembly configured to perform a lighting function with a plurality of first components, and a second assembly configured to perform a signaling function with a plurality of second components. The plurality of second components and the plurality of first components have at least one component in common, making it possible to enhance the compactness of the luminous module.

14 Claims, 4 Drawing Sheets

(51) Int. Cl.
   *F21S 41/255* (2018.01)
   *F21S 41/26* (2018.01)
   *F21S 41/32* (2018.01)
   *F21S 43/14* (2018.01)
   *F21S 43/237* (2018.01)
   *F21S 43/245* (2018.01)

(52) U.S. Cl.
   CPC ............ *F21S 41/26* (2018.01); *F21S 41/321* (2018.01); *F21S 43/14* (2018.01); *F21S 43/237* (2018.01); *F21S 43/245* (2018.01)

(56) References Cited

U.S. PATENT DOCUMENTS

| | | | | |
|---|---|---|---|---|
| 8,882,316 | B2* | 11/2014 | Natsume | F21S 43/20 362/520 |
| 9,121,565 | B2 | 9/2015 | Marcori et al. | |
| 10,247,380 | B2* | 4/2019 | Hager | F21S 41/143 |
| 11,505,114 | B2 | 11/2022 | Takori et al. | |
| 2015/0277027 | A1* | 10/2015 | Koizumi | F21S 43/247 362/511 |

FOREIGN PATENT DOCUMENTS

| | | |
|---|---|---|
| EP | 1610157 A1 | 12/2005 |
| EP | 1775511 A1 | 4/2007 |
| JP | 2012190762 A * | 10/2012 |
| JP | 2015088398 A | 5/2015 |
| JP | 2016119283 A | 6/2016 |
| JP | 2018026247 A | 2/2018 |
| WO | 2017052478 A1 | 3/2017 |

OTHER PUBLICATIONS

European Patent Office, International Search Report (with English translation) and Written Opinion of corresponding International Application No. PCT/EP2022/081731, dated Feb. 3, 2023.

Japan Patent Office, Office Action (including machine translation) in corresponding Japanese Patent Application No. 2024-529442, dated Jun. 13, 2025, 12 pages.

* cited by examiner

LIGHT MODULE FOR LIGHTING AND SIGNALING

TECHNICAL FIELD

The present invention relates to the field of lighting and light signaling, in particular for motor vehicles. More precisely, the invention relates to the integration of luminous modules for lighting and signaling in a motor vehicle.

BACKGROUND OF THE INVENTION

Motor vehicle lighting systems are generally capable of performing several luminous functions, including lighting functions, as well as signaling functions.

For this purpose, separate modules may be dedicated to respective luminous functions. The increase in luminous functions for lighting and signaling in motor vehicles then leads to a rise in the number of luminous modules. The space requirement associated with the performance of these functions is significant.

It is possible to perform several lighting functions in the same luminous module, in particular low beam (LB) and high beam (HB) functions. However, there is no provision in such modules to integrate signaling functionalities. Moreover, the light sources dedicated to lighting and those dedicated to signaling generally have very different technologies and/or powers, which makes it difficult to pool such functions.

In particular, some signaling functions can be carried out by means of a light guide. One such example is presented in patent EP 1 775 511 B. A light source injects a light beam into a light guide which projects it continuously in the longitudinal direction of the light guide. Such light guides make it possible to perform complex signaling functions, with a single light source.

However, it is still difficult to reduce the space requirement in a luminous device for a motor vehicle, particularly when luminous functions for lighting and signaling, using separate light sources, are required.

It is therefore desirable to propose a compact and economical luminous module making it possible to perform both lighting and signaling functions.

SUMMARY OF THE INVENTION

The present invention improves the situation.

To this end, a first aspect of the invention relates to a luminous module of a motor vehicle, comprising:
  a first assembly configured to perform a lighting function, and comprising a plurality of first components, the first components comprising at least:
    a first light source capable of emitting a first light beam;
    a reflector capable of reflecting the first light beam; and
    an optical system capable of projecting the reflected first light beam outside the luminous module;
  a second assembly configured to perform a signaling function, and comprising a plurality of second components, the plurality of second components comprising at least:
    a second light source capable of emitting a second light beam;
    a light guide configured to guide the second light beam.
The plurality of second components and the plurality of first components have at least one component in common.

The pooling of components between the lighting and signaling functions advantageously makes it possible to reduce the total number of components in the luminous module, and thus leads to a reduction in the space requirement and costs associated with the luminous module.

According to one embodiment, the reflector may comprise a first reflective surface capable of reflecting the first light beam and the optical system may comprise a projection lens configured to form an image of the first reflective surface when the first light beam is projected outside the luminous module.

Such an embodiment makes it possible to reduce the thickness of the first light beam, and thus makes it possible to reduce the size of the optical system, thus further enhancing the compactness of the luminous module.

According to one embodiment, the light guide may comprise an exit face oriented toward the outside of the module and a reflection face capable of reflecting part of the second light beam toward the exit face, the component in common may comprise a diffusing or reflective surface arranged opposite the reflection face of the light guide.

Thus, the component in common contributes to the lighting function on the one hand, and improves the light output associated with the signaling function on the other hand.

According to one embodiment, the component in common may comprise a cavity shaped to receive the light guide.

Thus, the component in common contributes to the lighting function on the one hand, and facilitates assembly of the components associated with the signaling function on the other hand.

In addition or as an alternative, the diffusing or reflective surface may be in the cavity.

Thus, the component in common contributes to the lighting function on the one hand, and facilitates assembly of the components associated with the signaling function and improves the light output of this function on the other hand.

According to one embodiment, the plurality of second components may comprise two second light sources and two light guides, each light guide being associated respectively with a second light source, and the plurality of second components and the plurality of first components may have at least two components in common.

This makes it possible to perform complex signaling functions while reducing the space requirement associated with the luminous module.

According to one embodiment, the plurality of first components further comprises a support for the first light source, and the component in common may comprise the reflector and/or the support for the first light source.

Thus, the component in common is a component very generally required to fulfill the lighting function, and this embodiment thus limits the number of components of the luminous module.

The common component may be the reflector and the reflector may comprise a first reflective surface capable of reflecting the first light beam and a second reflective or diffusing surface arranged opposite the light guide of the second assembly.

This embodiment takes advantage of the fact that the reflector comprises several surfaces, of which the inner surface is generally used for the lighting function. An outer surface may thus be used to improve the light output of the signaling function.

Alternatively, the common component may be the support for the first light source, and the support may comprise a third reflective or diffusing surface opposite the light guide of the second assembly.

Thus, the component in common fulfills a support function in the lighting function and at the same time improves the light output of the signaling function. The support may comprise a radiator, in which case it also makes it possible to cool the first light source.

Alternatively or in addition, the reflector may comprise a first reflective surface capable of reflecting the first light beam and a second reflective or diffusing surface arranged opposite one of the light guides of the second assembly, and the support for the first light source may comprise a third reflective or diffusing surface opposite the other light guide of the second assembly.

This makes it possible to perform complex signaling functions, with good light output, and with good compactness of the luminous module.

As an alternative or in addition, the two light guides may be arranged on either side of the optical system of the first assembly.

The compactness of the luminous module is thus improved.

According to one embodiment, the reflector and/or the support for the first light source is configured to allow part of the second light beam to reach the first assembly such that it illuminates the optical system.

For example, the second light source and the light guide are arranged such that said part of the second light beam can reach the first assembly directly, or by passing through the second light guide.

The reflector and/or the support may include at least one through hole to allow the second light beam to reach the first assembly.

According to one embodiment, the second assembly may further comprise at least one diffusing screen capable of diffusing at least part of the light beam guided by the light guide toward the outside of the luminous module.

Such a diffusing screen improves the homogeneity of the signaling beam coming from the first assembly.

BRIEF DESCRIPTION OF DRAWINGS

Other features and advantages of the invention will become apparent on examining the following detailed description and the appended drawings, in which.

DETAILED DESCRIPTION OF THE INVENTION

The description concentrates on the features that differentiate the method or the system from those known in the prior art. How light-emitting diodes operate or are manufactured will not be described in detail since it is known per se in the prior art.

Figure 1:
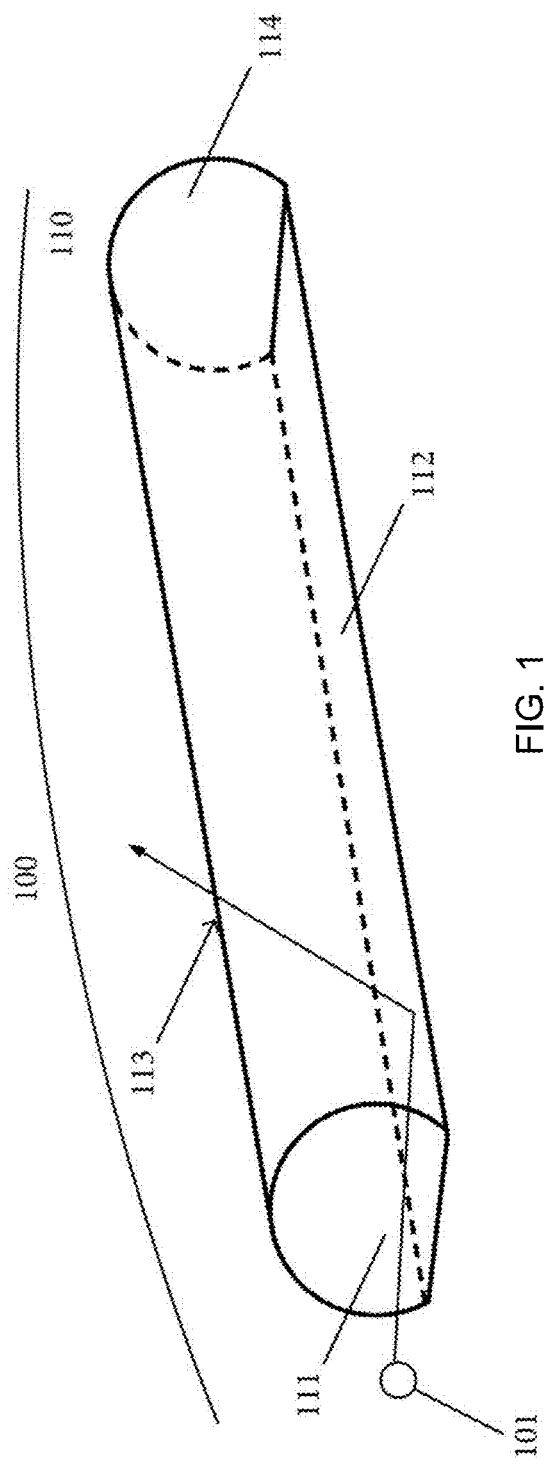
FIG. 1 shows an assembly of components configured to perform a signaling function according to the invention.

FIG. 1 depicts components of an assembly 100 configured to perform a signaling function according to an embodiment of the invention.

The assembly 100 comprises an optical guide 110, or light guide, capable of propagating, or guiding, a light beam emitted by a light source 101. In the example of FIG. 1, the optical guide 110 is rectilinear. The optical guide 110 may of course have other shapes, and may in particular include curvatures such as one or more circular arc portions.

In the embodiment shown, the optical guide 110 has a circular section. However, the invention also covers the case where the optical guide 110 has an elliptical, oval or square section or any other geometric or non-geometric shape.

No restriction is imposed on the material used for the light guide 110. For example, it may be a transparent polymer, polycarbonate, or polymethyl methacrylate (PMMA).

The light guide 110 has an entrance face 111, opposite which the light source 101 is arranged. No restriction is imposed on the technology used for the light source, which may for example be a light-emitting diode (LED). The light guide 110 may also include an end face 114, which constitutes the end opposite the entrance face 111, and which may be without a light source.

Optionally, it is possible to provide a light source at each end of the light guide 110.

The light guide 110 further comprises two main faces oriented longitudinally:
  an exit face 113 for the exit of part of the light beam guided by the light guide 110. The exit face 113 may be smooth and continuous, or may have ridges. The exit face 113 is adapted to be directed toward the outside of a luminous module in which the light guide 110 is to be mounted;
  a reflection face 112, which is reflective or diffusing, and which can direct part of the light beam coming from the source 101 toward the exit face 113. The reflection face may include reflective elements such as prisms. The prisms may be placed side by side and ensure reflection of the light rays having a non-zero angle of incidence with a longitudinal optical axis of the optical guide. No restriction is imposed on the shape of such prisms, which are not shown in FIG. 1. The shapes and sizes of the various prisms of the reflection face 112 may also vary. According to another alternative, the reflective elements of the reflection face 112 may be reflective spikes, such as hollows distributed regularly within the reflection face 112, in particular during molding of the part constituting the light guide 110. Examples of reflective elements are given in the patent application with publication number EP 1 605 201, and in European patent EP 1 434 000.

Figure 2:
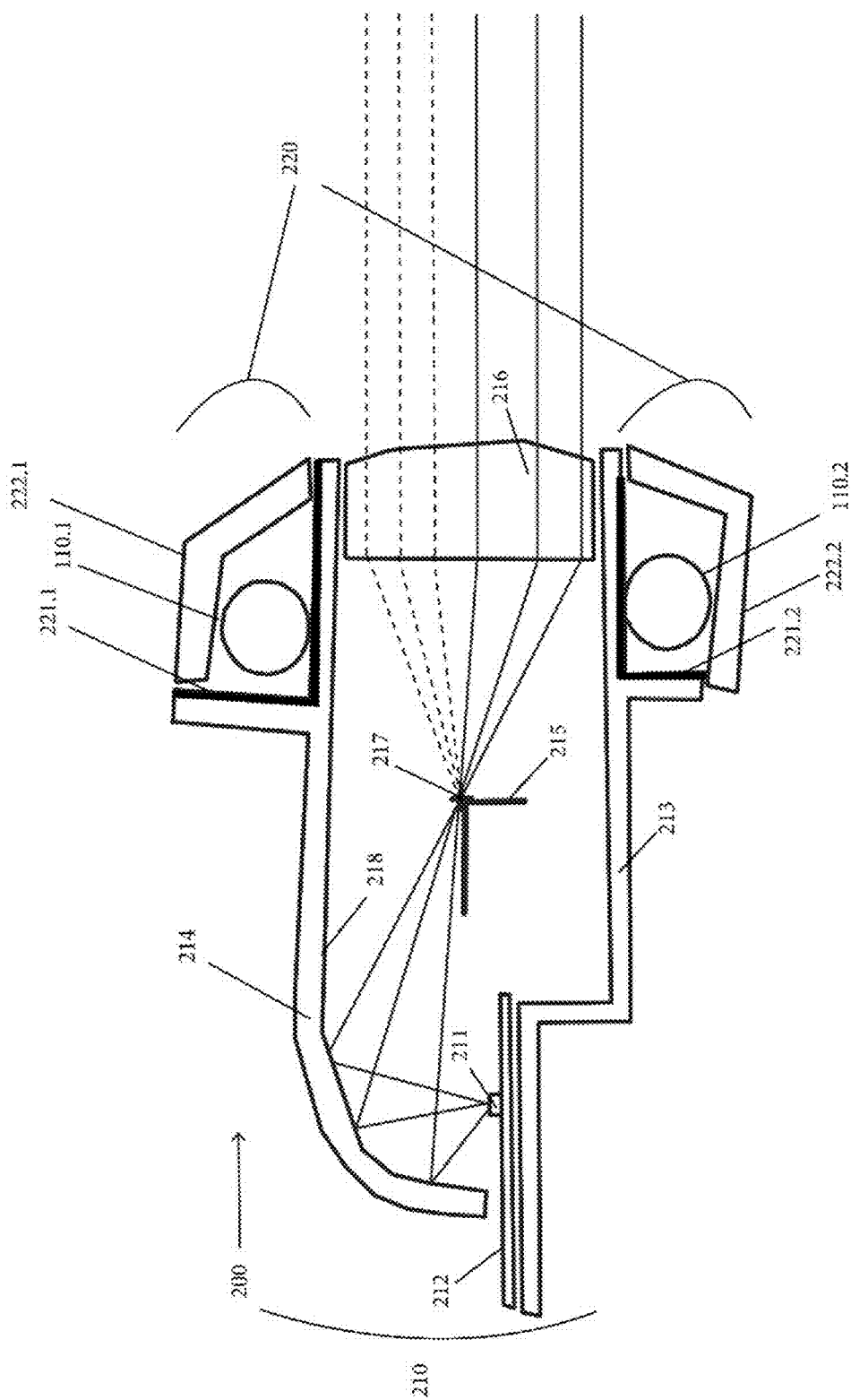
FIG. 2 is a view in section of a luminous module according to a first embodiment of the invention.

FIG. 2 is a view in section of a luminous module 200 according to a first embodiment of the invention.

The view in section is a view in a plane X-Z, X corresponding substantially to an axis of propagation of the light rays coming from the luminous module, or optical axis, and Z a substantially vertical direction.

The luminous module 200 comprises a first assembly 210 capable of performing a lighting function and a second assembly 220 capable of performing a signaling function. No restriction is imposed on these functions. The lighting functions may in particular be low beam (LB) or high beam (HB) functions. The signaling functions may include a position light function, referred to as position lamp, or a flashing function or TI, which stands for Turn Indicator, or a daytime light function or DRL, which stands for Daytime Running Light.

The first assembly 210 comprises a plurality of first components, such as for example:
  a first light source 211 capable of generating a first light beam, some light rays of which are shown in FIG. 2. The first light source 211 may emit light rays of the first light beam in a half-space delimited by the main plane of the source 211, and in a main direction perpendicular to the plane of the source 211. The main direction of emission may for example be between −40° and +40° relative to an optical axis of the optical system 216 described below. No restriction is imposed on the technology associated with the first light source 211, which may in particular be an LED type source, which has the advantage of being compact and having low energy consumption with good light output. The first light source 211 may be placed on a printed circuit board 212 or PCB. In this case, the printed circuit board 212 is one of the first components;

a radiator 213 capable of dissipating some of the heat generated by the first light source 211, in particular, the first light source 211 is positioned on the radiator 213 directly or via the printed circuit board 212;

a reflector 214 comprising a first reflective surface 218. The first reflective surface 218 may in particular be a surface of revolution, with an elliptical profile, in the shape of a cap in a half-space delimited by a horizontal plane X-Y. The light source 211 is positioned close to a first optical focal point of the first surface 218. Such close positioning means that the light source is at most a few millimeters from the first focal point of the first surface 218, in particular at most one millimeter from the first focal point of the first surface 218. The light rays coming from the first light source 211 are thus reflected in a convergent manner toward a second focal point of the first surface 218;

a reflective surface referred to as a bender 215, which may be flat with a cut-off edge located close to the second focal point of the first surface 218. The bender 215 ensures an upward reflection of the rays which do not pass precisely through the second focal point of the first surface 218;

an optical system 216 capable of projecting the light rays reflected by the bender 215 or by the reflector 214 outside the luminous module 200. The optical system 216 may in particular comprise a projection lens, such as a thick lens, positioned such that a focal point 217 of the projection lens is located close to the edge of the bender 215, in other words close to the second focal point of reflector 214. The optical system 216 may include optical elements other than the projection lens, such as one or more mirrors in particular.

The bender 215 is so named as it bends toward the top of the projection lens those rays which would otherwise form an upper portion of the lighting beam.

The first assembly according to the first embodiment may further comprise other first components allowing the lighting function to be performed, which are not shown in FIG. 2.

The luminous module according to the invention further comprises a second assembly 220 capable of performing a signaling function. The second assembly 220 comprises a plurality of second components, such as in particular:

at least one second light source, such as the light source 101 described with reference to FIG. 1. The second light source is capable of emitting a second light beam;

at least one light guide 110 capable of guiding the second light beam coming from the second light source.

Two light guides 110.1 and 110.2 have been shown in FIG. 2, merely by way of illustration. The invention also covers the case where a single light guide 110.1 or 110.2 is provided to perform the signaling function. Each of the light guides 110.1 and 110.2 is then associated with a respective second light source.

Optionally, the second assembly 220 may further comprise a diffusing screen 222.1 or 222.2 located opposite the exit face 113 of the light guide 110.1 or 110.2, and capable of diffusing a signaling beam toward the outside of the module 200. No restriction is imposed on the diffusing screen 222.1 or 222.2, which may be made of plastic, with a pattern to diffuse the light, graining, or an opalescent material.

According to the invention, the first assembly 210 and the second assembly 220 have at least one component in common. In other words, the plurality of first components and the plurality of second components have at least one component in common. The invention thus allows components to be pooled between the lighting function and the signaling function, which advantageously makes it possible to reduce the space requirement associated with the luminous module 200, as well as its cost.

For example, the component(s) in common may include:

the reflector 214 only. The reflector 214 may be shaped in such a way as to accommodate and facilitate the insertion and/or attachment of the light guide 110.1 in the luminous module 200. To this end, the reflector 214 may comprise a cavity in which the light guide 110.1 may be housed, as shown in FIG. 2. The cavity may have two segments forming an angle as in FIG. 2, may be rounded or may have any other shape facilitating the insertion/attachment of the light guide 110.1. Complementarily or as an alternative, the reflector 214 may comprise a second reflective surface 221.1. The reflector 214 thus makes it possible, in addition to its contribution to the lighting function in the first assembly 210, to fulfill a mechanical and/or optical function in the second assembly 220, thus also contributing to the signaling function of the luminous module 200;

a support for the first source 211 only, the support comprising the printed circuit board 212 and/or radiator 213. As shown in FIG. 2, the radiator 213 may be shaped in such a way as to accommodate and facilitate the insertion and/or attachment of the light guide 110.2 in the luminous module 200. To this end, the radiator 213 may comprise a cavity in which the light guide 110.2 may be housed, as shown in FIG. 2. The cavity may have two segments forming an angle as in FIG. 2, may be rounded or may have any other shape facilitating the insertion/attachment of the light guide 110.2. Complementarily or as an alternative, the radiator 213 may comprise a third reflective surface 221.2. The radiator 213 thus makes it possible, in addition to its contribution to the lighting function in the first assembly 210, to fulfill a mechanical and/or optical function in the second assembly 220, thus also contributing to the signaling function of the luminous module 200;

the reflector 214 and the support for the first light source 211. This is the embodiment illustrated in FIG. 2, in which there are two components in common between the first assembly 210 and the second assembly 220.

Note that the invention applies to other common components, as well as to a number greater than 2 common components.

The invention thus makes it possible, by pooling components between a lighting function and a signaling function, to reduce the total number of components, and thus to reduce the space requirement of the luminous module 200 as well as its cost.

Furthermore, it is possible to arrange for light to leak between the first assembly 210 and the second assembly 220. Specifically, it may be advantageous for part of the second light beam, and in particular for the light emitted by the second light sources and transmitted by the light guides 110.1, 110.2, to reach the first assembly 210, and to illuminate the optical system 216. In this case, when the second assembly 220 performs the signaling function, the diffusing screen 222.1, 222.2 is illuminated, as is the optical system 216. The optical system 216 is therefore illuminated independently of the activation of the lighting function emitted by the first assembly 210.

In order to allow light to leak from the second assembly 220 to the first assembly 210, through holes may be provided in the reflector 214 and/or in the radiator 213 close to the light guides 110.1, 110.2.

This arrangement is particularly advantageous when the signaling function performed by the second assembly 220 is activated both during the day, in particular to perform the daytime light function, and at night, in particular to perform the position light function. This makes it possible to obtain a light signature of the luminous module 200 which is identical both during the day, when only the signaling function is activated, and at night, when the lighting and signaling functions are activated.

As shown in FIG. 2, in the case where the second assembly 220 comprises two light guides 110.1 and 110.2, the light guides may be arranged on either side of the optical system 216. Thus, the compactness of the luminous module 200 is improved.

Figure 3:
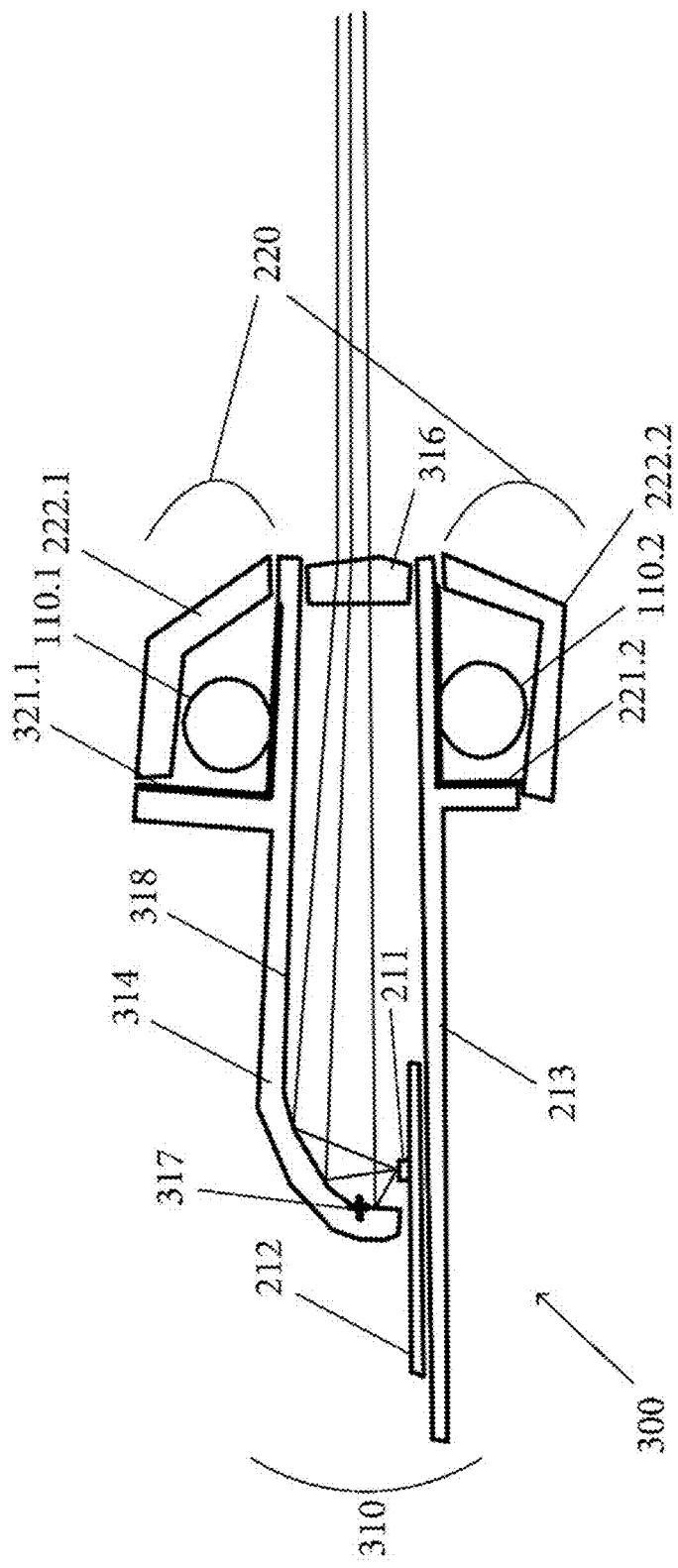
FIG. 3 is a view in section of a luminous module according to a second embodiment of the invention.

FIG. 3 is a view in section of a luminous module 300 according to a second embodiment of the invention.

The sectional plane of FIG. 3 is identical to that of FIG. 2. The elements which are identical between FIGS. 2 and 3 are identified by the same reference numerals.

The first assembly 310 according to the second embodiment may include:
  a reflector 314 described below;
  an optical system 316 described below;
  the first light source 211, the printed circuit board 212 and the radiator 213 as described above.

The reflector 314 according to the second embodiment may be in the shape of a shell or cap, comprising a first reflective surface 318 on the inner face of the reflector 314. The first reflective surface 318 advantageously has a profile of elliptical or parabolic type. It is advantageously a surface of revolution around an axis parallel to the optical axis. Alternatively, it may be a free-form surface or a swept surface or an asymmetric surface. It may also have a plurality of sectors. The expression "parabolic type" generally applies to reflectors of which the first reflective surface has a single focal point, i.e. one region of convergence of the light rays, such that the light rays emitted by the first light source 211 placed in this region of convergence are projected to a great distance after reflection from the first reflective surface 218. "Projected to a great distance" means that these light rays do not converge toward a region located at least at 10 times the dimensions of the reflector 314. In other words, the reflected rays do not converge toward a region of convergence or, if they do converge, this region of convergence is located at a distance greater than or equal to 10 times the dimensions of the reflector 314. It is therefore possible for a first surface 318 of parabolic type to have or not to have parabolic portions. The reflector 314 having such a first surface 318 is generally used alone to create the first light beam.

Thus, the first assembly 310 does not include a bender 215 as in the first embodiment.

The first light source 211 is arranged at a focal point of the first surface 318 such that the light rays of the first light beam are collected and reflected along the optical axis. At least some of these reflected rays have angles of inclination in a vertical plane in relation to the optical axis that are less than or equal to 25°, and preferably less than or equal to 10°, so as to be under what are referred to as Gaussian conditions, making it possible to obtain a stigmatism, that is to say a clearness of the image projected by the optical system 316. They are advantageously the rays reflected by a rear portion, on the left in FIG. 3, of the first surface 318.

The optical system 316 according to the second embodiment may comprise a projection lens, such as a plano-convex lens, that is to say with a planar entrance face and a convex exit face. In this example, the focal length of the lens 316 is great, for example greater than 60 mm. In addition, the height of the lens 316 is low, for example less than 30 mm, or even less than 15 mm. This is facilitated by the slight inclination of the rays to be deflected. Thus, the lens 316 is said to be thin, for example its thickness is less than 6 mm. The lens 316 has a focal point 317 which is located along the optical axis, at the first source 211 or behind the first source 211. In this case, the focal point 317 is located at the first surface 318. Note that it is possible for the focal point 317 to be located behind or in front of the first surface 318 provided that it is close to this first surface 318, preferably at less than 10 mm and preferentially less than 5 mm therefrom. Thus, the optical system 316 is capable of forming an image of the first reflective surface 318.

If the first surface 318 is of elliptical type, it has a second focal point situated to the front of the lens 316, and close to the optical axis. Note that it is also possible for this focal point to be located behind the lens 316, provided that it is close to the lens 316, so as to reduce the width of the beam on the entrance face of the lens 316.

The second embodiment thus has the advantage of greater compactness compared to the first embodiment, particularly in the vertical direction. To be specific, owing to the small thickness of the first light beam that reaches the lens 316, it is possible to reduce its vertical size. It may thus be between 5 and 30 mm, preferably less than 15 mm.

The second assembly 220 may be identical to that described with reference to FIG. 2, and may comprise at least one second light source 101 and at least one light guide 110. In the example of FIG. 3, the second assembly 220 comprises two second light sources 101, two light guides 110.1 and 110.2, as well as two diffusing screens 222.1 and 222.2.

In order to further improve the compactness of the luminous module 300, the first assembly 310 and the second assembly 220 comprise at least one component in common.

For example, the components in common may include:
  the reflector 314 only. The reflector 314 may be shaped in such a way as to accommodate and facilitate the insertion and/or attachment of the light guide 110.1 in the luminous module 300. To this end, the reflector 314 may comprise a cavity in which the light guide 110.1 may be housed, as shown in FIG. 3. The cavity may have two segments forming an angle as in FIG. 3, may be rounded or may have any other shape facilitating the insertion/attachment of the light guide 110.1. Complementarily or as an alternative, the reflector 314 may comprise a second reflective surface 321.1. The reflector 314 thus makes it possible, in addition to its contribution to the lighting function in the first assembly 310, to fulfill a mechanical and/or optical function in the second assembly 220, thus also contributing to the signaling function of the luminous module 300;

the support for the first source 211 only, the support comprising the printed circuit board 212 and/or radiator 213, and remaining unchanged compared to the first embodiment;

the reflector 314 and the support for the first source 211. This is the embodiment illustrated in FIG. 3, in which there are two components in common between the first assembly 310 and the second assembly 220.

As in the first embodiment, light may be allowed to leak between the first assembly 310 and the second assembly 220. In particular, the reflector 314 and/or the radiator 213 may be arranged such that part of the second light beam, and in particular the light emitted by the second light sources and transmitted by the light guides 110.1, 110.2, can reach the first assembly 310, and can exit the luminous module 300 via the optical system 316.

The collectors 214 and 314 according to the invention may advantageously be made from materials exhibiting good heat resistance, for example glass or synthetic polymers such as polycarbonate (PC) or polyetherimide (PEI).

The second reflective surfaces 221.1, 221.2 and 321.1 may be formed by a mirror, a grained and/or patterned surface, or a white coating.

Figure 4:
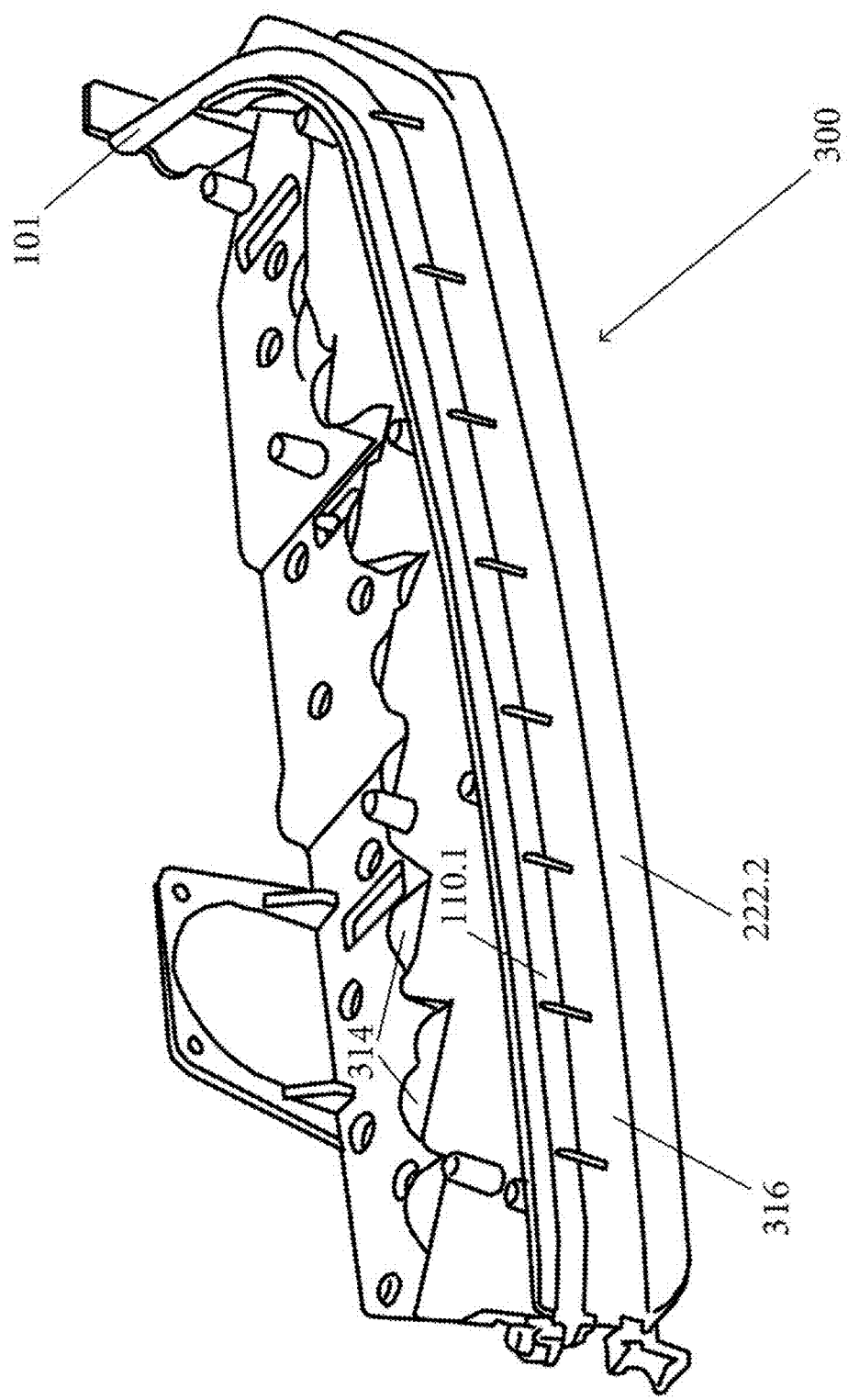
FIG. 4 is a three-dimensional view of the luminous module according to the second embodiment of the invention.

FIG. 4 is a three-dimensional view of a luminous module 300 according to the second embodiment of the invention.

The view shown is facing the luminous module, from the outside, from above. The luminous module 300 shown comprises a diffusing screen 222.2 opposite the second light guide 110.2, which is hidden by the diffusing screen 222.2. The diffusing screen 222.1 is not shown in order to make the first light guide 110.1 visible.

As shown in FIG. 4, the optical system 316 may be shared between several reflectors 314 of the luminous module 300. No restriction is imposed on the number of reflectors 314 or their arrangement in the luminous module. The optical system 316 shown in FIG. 4 has a very small vertical dimension, and the luminous module 300 is compact while ensuring several lighting and signaling functions.

The present invention is not limited to the embodiments described above by way of examples; it covers other variants.

What is claimed is:

1. A luminous module of a motor vehicle, comprising:
a first assembly configured to perform a lighting function, and including a plurality of first components, the first components including at least:
a first light source capable of emitting a first light beam;
a support for the first light source;
a reflector capable of reflecting the first light beam, with the reflector having a first surface and a second surface that is opposite the first surface; and
an optical system capable of projecting the reflected first light beam outside the luminous module;
a second assembly configured to perform a signalling function, and including a plurality of second components, the plurality of second components including at least:
a second light source capable of emitting a second light beam;
a third light source capable of emitting a third light beam;
two light guides, each configured to guide the second light beam or the third light beam and arranged on either side of the optical system of the first assembly;

wherein the reflector includes a first reflective surface capable of reflecting the first light beam and a second reflective surface arranged opposite one of the light guides of the second assembly, and wherein the support for the first light source includes a third reflective surface opposite the other light guide of the second assembly, with the first reflective surface being on the first surface and the second reflective surface being on the second surface, and wherein the plurality of second components and the plurality of first components have at least two components in common, with one of the at least two components in common includes the reflector or the support for the first light source.

2. The luminous module as claimed in claim 1, wherein the optical system includes a projection lens configured to form an image of the first reflective surface when the first light beam is projected outside the luminous module.

3. The luminous module as claimed in claim 1, wherein one of the two light guides includes an exit face oriented toward the outside of the module and a reflection face capable of reflecting part of the second light beam toward the exit face, wherein at least two the components in common includes a diffusing or reflective surface arranged opposite the reflection face of the light guide.

4. The luminous module as claimed in claim 1, wherein the at least two the components in common includes a cavity shaped to receive the light guide.

5. The luminous module as claimed in claim 4, wherein a diffusing or reflective surface is in the cavity.

6. The luminous module as claimed in claim 1, wherein the reflector or the support for the first light source is configured to allow part of the second light beam to reach the first assembly such that it illuminates the optical system.

7. The luminous module as claimed in claim 6, wherein the second assembly includes at least one diffusing screen capable of diffusing at least part of the light beam guided by the light guide toward the outside of the luminous module.

8. The luminous module as claimed in claim 1, wherein the reflector and the support for the first light source is configured to allow part of the second light beam to reach the first assembly such that it illuminates the optical system.

9. The luminous module as claimed in claim 8, wherein the second assembly includes at least one diffusing screen capable of diffusing at least part of the light beam guided by the light guide toward the outside of the luminous module.

10. The luminous module as claimed in claim 1, wherein the at least two the components in common includes the reflector and the support for the first light source.

11. The luminous module as claimed in claim 10, wherein the reflector or the support for the first light source is configured to allow part of the second light beam to reach the first assembly such that it illuminates the optical system.

12. The luminous module as claimed in claim 11, wherein the second assembly includes at least one diffusing screen capable of diffusing at least part of the light beam guided by the light guide toward the outside of the luminous module.

13. The luminous module as claimed in claim 10, wherein the reflector and the support for the first light source is configured to allow part of the second light beam to reach the first assembly such that it illuminates the optical system.

14. The luminous module as claimed in claim 13, wherein the second assembly includes at least one diffusing screen capable of diffusing at least part of the light beam guided by the light guide toward the outside of the luminous module.

* * * * *